United States Patent [19]
Rozman

[11] Patent Number: 6,130,828
[45] Date of Patent: Oct. 10, 2000

[54] MULTIPLE OUTPUT CONVERTER HAVING SELF-SYNCHRONIZED PULSE WIDTH MODULATION REGULATION

[75] Inventor: Allen F. Rozman, Richardson, Tex.

[73] Assignee: Lucent Technologies, Inc., Murray Hill, N.J.

[21] Appl. No.: 09/383,343

[22] Filed: Aug. 26, 1999

[51] Int. Cl.[7] ............................................. H02M 3/335
[52] U.S. Cl. ............................................................ 363/21
[58] Field of Search ................................. 363/16, 20, 21, 363/40, 41, 55, 56, 95, 97, 131

[56] References Cited

U.S. PATENT DOCUMENTS

| | | |
|---|---|---|
| 5,274,543 | 12/1993 | Loftus, Jr. . |
| 5,282,123 | 1/1994 | Boylan et al. . |
| 5,291,382 | 3/1994 | Cohen . |
| 5,303,138 | 4/1994 | Rozman . |
| 5,327,333 | 7/1994 | Boylan et al. . |
| 5,490,055 | 2/1996 | Boylan et al. . |
| 5,528,482 | 6/1996 | Rozman . |
| 5,541,828 | 7/1996 | Rozman . |
| 5,590,032 | 12/1996 | Bowman et al. . |
| 5,625,541 | 4/1997 | Rozman . |
| 5,663,876 | 9/1997 | Newton et al. . |
| 5,726,869 | 3/1998 | Yamashita et al. ................. 363/21 |
| 5,870,299 | 2/1999 | Rozman . |
| 5,872,705 | 2/1999 | Loftus, Jr. et al. . |
| 5,963,437 | 10/1999 | Sekiya .................................. 363/21 |
| 6,011,703 | 1/2000 | Boylan et al. ....................... 363/21 |
| 6,028,776 | 10/1999 | Ji et al. ................................ 363/21 |

OTHER PUBLICATIONS

Cherry Semiconductor Corporation "Secondary Side Post Regulator for AC/DC and DC/DC Multiple Output Converters CS–5101" Mar. 1997, pp. 1–7.

Cherry Semiconductor Corporation "Secondary Side Post Regulator (SSPR) for Switching Power Supplies with Multiple Outputs CS 5101 Application Note". Apr. 1997, pp. 1–13.

*Primary Examiner*—Matthew Nguyen
*Attorney, Agent, or Firm*—Locke Liddell & Sapp LLP

[57] ABSTRACT

A DC—DC converter includes a transformer having a primary winding and a secondary winding. The secondary winding includes first and second terminals. An input circuit is connected to the primary winding for coupling an input DC voltage to the primary winding. A first output channel is coupled to the first terminal of the secondary winding, and is connected to a first output. The first channel includes a first diode connected in series with a first inductor. A second output channel is coupled to the first terminal of the secondary winding, and is connected to a second output. The second channel includes a second diode connected in series with a second inductor. A first and a second capacitor connect the first and second outputs to the second terminal of the secondary winding. A third diode connects the first output channel to the second terminal of the secondary winding. A fourth diode connects the second output channel to the second terminal of the secondary winding. An amplifier is coupled to one of the outputs. An integrator circuit is connected to the output terminal of the amplifier. A switch having an on and off time is connected to the transformer secondary winding and to the integrator circuit, such that the switch on and off time is controlled by the output of the integrator circuit. A fifth diode is coupled between the transformer secondary winding and the integrator circuit for resetting the integrator circuit.

25 Claims, 3 Drawing Sheets

MULTIPLE OUTPUT CONVERTER HAVING SELF-SYNCHRONIZED PULSE WIDTH MODULATION REGULATION

BACKGROUND OF THE INVENTION

DC—DC converters are normally used as constant DC voltage power supplies. The desirability of having a DC—DC converter that provides a number of different voltage outputs to a number of different independent loads has been recognized. There is a continuing need for such a circuit which is of relatively simple construction and relatively inexpensive, and which provide stable voltage levels to a number of independent loads that, if desired, can be electrically isolated. With electrical isolation, noise, impedance changes, and the like from one load would not affect the power transmitted to another load.

Multiple output DC—DC converters providing a regulated voltage have typically required separate outputs provided by separate transformer windings as well as independent direct voltage regulating controls for each output where precise regulation is required. In a typical forward or flyback converter with multiple outputs, the non-conduction intervals of the power switch may result in a noncontinuous transfer of energy to the output which results in an inefficient transfer of energy to the output.

Magnetic amplifiers have been used as pulse width modulators in DC—DC converters because of their high reliability and current surge suppression characteristics. In addition, the size of the magnetic amplifier can be made small in the high frequency switching. When multiple non-interactive outputs are required from a single DC—DC converter, magnetic amplifiers are suitable as pulse width modulator elements, since it is easy to control the duty ratio in the secondary circuit of the transformer and to isolate the input and output. However, the use of magnetic amplifiers as pulse width modulators may cause a limit on the maximum duty cycle which limits the available power. Magnetic amplifiers also, in some application, are too large in size, and are expensive components of a DC—DC converter.

A need has thus arisen for a self-synchronized pulse width modulator to provide regulation in a multiple output converter which is small in size, inexpensive, and provides improved performance over magnetic amplifiers.

SUMMARY OF THE INVENTION

In accordance with the present invention, a DC—DC converter is provided. The converter includes a transformer having a primary winding and a secondary winding. The secondary winding includes first and second terminals. An input circuit is connected to the primary winding for coupling an input DC voltage to the primary winding. A first output channel is coupled to the first terminal of the secondary winding, and is connected to a first output. The first channel includes a first rectifier, a diode or a synchronous rectifier MOSFET, for example connected in series with a first inductor. A second output channel is coupled to the first terminal of the secondary winding, and is connected to a second output. The second channel includes a second rectifier connected in series with a second inductor. A first and a second capacitor connect the first and second outputs to the second terminal of the secondary winding. A third rectifier connects the first output channel to the second terminal of the secondary winding. A fourth rectifier connects the second output channel to the second terminal of the secondary winding. An amplifier is coupled to one of the outputs. An integrator circuit is connected to the output terminal of the amplifier. A switch having an on and off time is connected to the transformer secondary winding and to the integrator circuit, such that the switch on and off time is controlled by the output of the integrator circuit. A fifth diode is coupled between the transformer secondary winding and the integrator circuit for resetting the integrator circuit.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
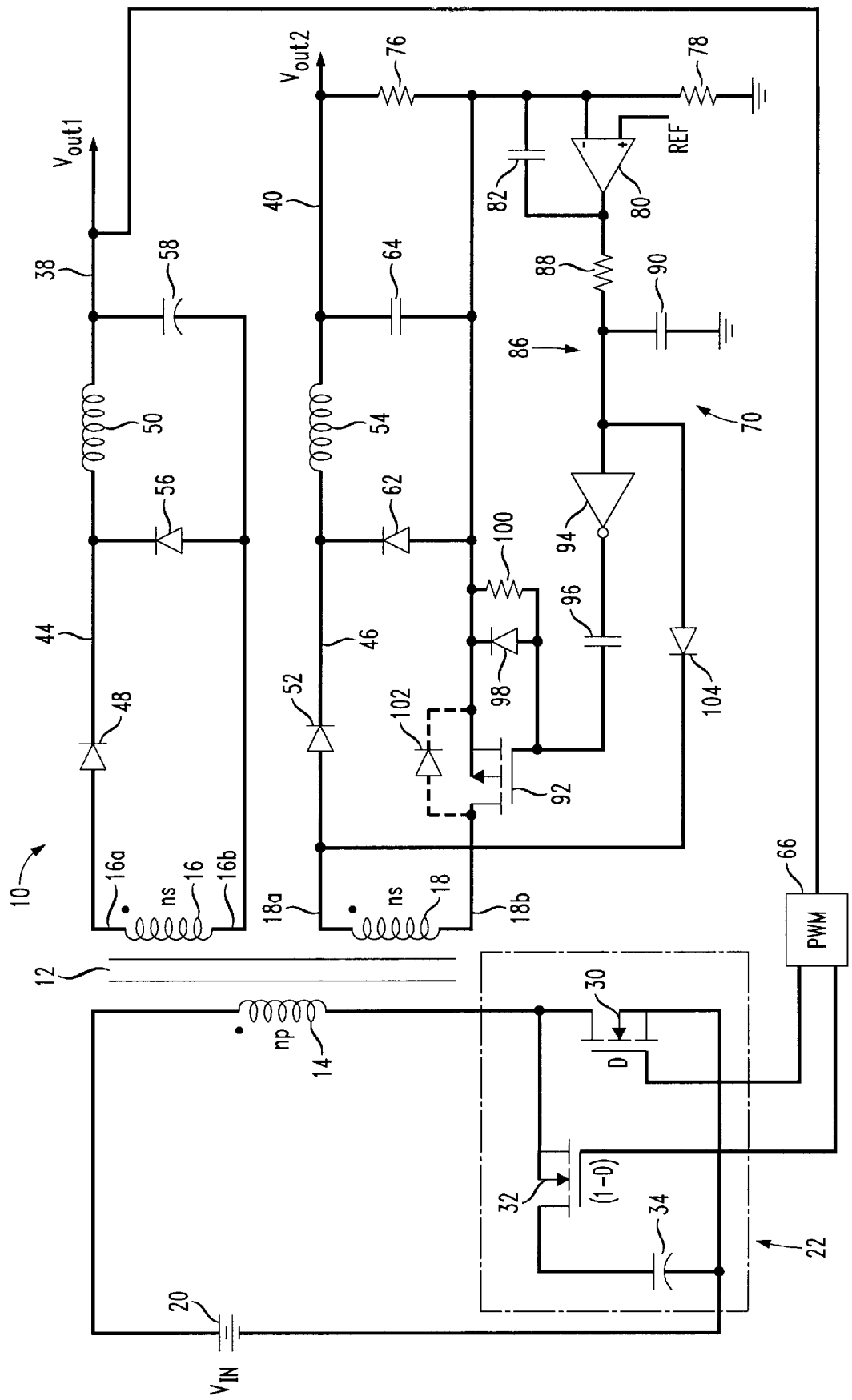
FIG. 1 is a schematic of an exemplary embodiment of the present DC—DC converter.

Referring to FIG. 1, a schematic diagram of an exemplary embodiment of the present DC—DC converter circuit is illustrated, and is generally identified by the numeral 10. Converter 10 includes a transformer 12 having a primary winding 14 and a first secondary winding 16 and a second secondary winding 18. Secondary winding 16 includes terminals 16a and 16b. Secondary winding 18 includes terminals 18a and 18b. A DC input voltage 20 is applied to primary winding 14 of transformer 12 under the control of an input circuit, generally identified by the numeral 22. A wide variety of input circuits are suitable for use with the present invention, including but not limited to, a forward converter, a zero voltage switching half bridge circuit, an active clamp circuit as illustrated in FIG. 1, a two transformer active clamp circuit, a push-pull circuit, a hard switching half-bridge, or a full-bridge. For a more complete discussion of alternative input circuits, see the following reference, incorporated herein be reference in its entirety: *Principles of Power Electronics*, by J. Kassakian, M. Schlecht, and G. Verghese, Addison-Wesley Publishing Company, 1991.

For a more detailed example of alternative input circuits and synchronous rectifier topologies, see the following patents, all incorporated herein by reference in their entirety: (1) U.S. Pat. No. 5,528,482 to Rozman, entitled Low Loss Synchronous Rectifier for Application to Clamped-Mode Power Converters, issued Jun. 18, 1996; (2) U.S. Pat. No. 5,274,543 to Loftus, entitled Zero Voltage Switching Power Converter Circuit with Loss-less Synchronous Rectifier Gate Drive, issued Dec. 28, 1993; and (3) U.S. Pat. No. 5,291,382 to Cohen entitled Pulse Width Modulated DC/DC Converter with Reduced Ripple Current Component Stress and Zero Voltage Switching Capability issued Mar. 1, 1994; and (4) U.S. Pat. No. 5,590,032 to Bowman et al., entitled Self Synchronized Drive Circuit for a Synchronous Rectifier in a clamped-mode Power Converter, issued Dec. 31, 1996.

Input circuit 22 in the form of a clamping circuit includes a FET power switch 30 which is periodically biased conducting to enable current flow, in response to input voltage 20 through primary winding 14 of transformer 12 for the duration D as a part of the periodic cycle. A clamping circuit including a series connected FET switch 32 and a capacitor 34 is connected in parallel with switch 30. Switch 32 is enabled conducting during the (1-D) portion of the periodic cycle. The voltage stored on capacitor 34 is charged to a level VC1 and clamps the voltage of transformer 12 primary winding 14 to a substantially constant average level $V_{in}/(1-D)$ during the non-conduction of switch 30.

Power output from secondary windings 16 and 18 of transformer 12 are connected to first and second outputs 38 and 40 via first and second output channels 44 and 46, respectively. First output channel 44 is connected to terminal 16a of secondary winding 16 and includes a rectifier (a diode or a MOSFET, for example) 48 and an inductor 50. Second output channel 46 is connected to terminal 18a of secondary winding 18 and includes a rectifier 52 and an inductor 54.

A rectifier 56 and capacitor 58 complete output 38. The rectifier 62 and capacitor 64 complete output 40.

The output 38 is regulated to a precise voltage by pulse width modulator (PWM) circuit 66 via input circuit 22. Pulse width modulator 66 operates to control the quality of the volt second product of power transformer 12 during conduction and non-conduction of the switch 30 in each cyclic interval of converter 10. The design of a regulating PWM circuit, including possibly a reference and an amplifier, is well known in the art and is not discussed in detail here. The output 40 is regulated independently of output 38 via MOSFET switch 92 and the self-synchronized pulse width modulator circuit, generally identified by the numeral 70. For a more detailed example of alternative multiple output rectifier topologies, see the following patent, incorporated herein by reference in its entirety: U.S. Pat. No. 5,541,828 to Rozman, entitled Multiple Output Converter with Continuous Power Transfer to an Output and With Multiple Output Regulation, issued Jun. 30, 1996.

An important aspect of the present invention is the use of a self-synchronized pulse width modulator (PWM) 70, which in the present invention performs as a Secondary Side Post Regulator (SSPR). The self synchronized PWM circuit 70 of the present invention differs from many prior art embodiments in its simplicity and in that there is no internal clocking mechanism setting the operating frequency of the PWM circuit. The frequency of operation of the PWM circuit 70 is controlled by the power transformer 12 secondary winding. The self synchronized PWM circuit 70 is very simple and is comprised of an analog error amplifier, an analog integrator, a switch driver to square up the output of the integrator, and a reset circuit coupled to the winding to reset the integrator prior to the start of the switching cycle of the input circuit. In a preferred embodiment, the error amplifier directly controls the voltage ramp of a simple R-C integrator, which in turn is reset with a single diode. Therefore, in contrast to many prior art PWM circuits, the self synchronized PWM circuit 70 of the present invention will not self oscillate independent of the input circuit, but rather the oscillation of the self synchronized PWM circuit is defined by the input circuit via the secondary winding. Other prior art SSPR circuits contain a variety of gates, latches and other logic to perform the SSPR function, and therefore do not use to advantage the inherent simplicity of the present invention. An example of a prior art PWM for secondary side regulation is the CS-5101 Secondary Side Post Regulator (SSPR), manufactured by the Cherry Semiconductor Company of East Greenwich, R.I. For a more detailed example of the operation of prior art SSPR circuits, see the following publications incorporated herein by reference as if reproduced herein in their entirety: "CS-5101 Application Note", published by the Cherry Semiconductor Company of East Greenwich, R.I., and "Designing with a New Secondary Side Post Regulator (SSPR) PWM Controller for Multiple Output Power Supplies", by G. Levin, Proceedings of APEC 1995, pp. 736–742.

With reference to FIG. 1, output 40 is coupled via resistors 76 and 78 to an operational amplifier 80. Operational amplifier 80 may be configured as an integrating error amplifier using capacitor 82. Operational amplifier 80 monitors the output voltage on output 40 and compares this voltage to an internal reference voltage, generating an error signal. The amplified error signal is applied to an integrator circuit, generally identified by the numeral 86. Integrator circuit 86 includes a resistor 88 and capacitor 90. The output of integrator circuit 86 is applied to a driver circuit 94, which acts to condition the output of integrator 86 into a waveform more suitable for driving control switch 92. Switch 92, a p-channel MOSFET in the exemplary embodiment, is driven by a driver 94 coupled to switch 92 via an inverting charge pump circuit comprising capacitor 96, diode 98 and resistor 100. Associated with switch 92 is a integral body diode 102.

Also connected to integrator circuit 86 is a diode 104 which is coupled to terminal 18a of secondary winding 18 of transformer 12. Diode 104 functions to reset integrator circuit 86 prior to the start of the next switching cycle.

Figure 2:
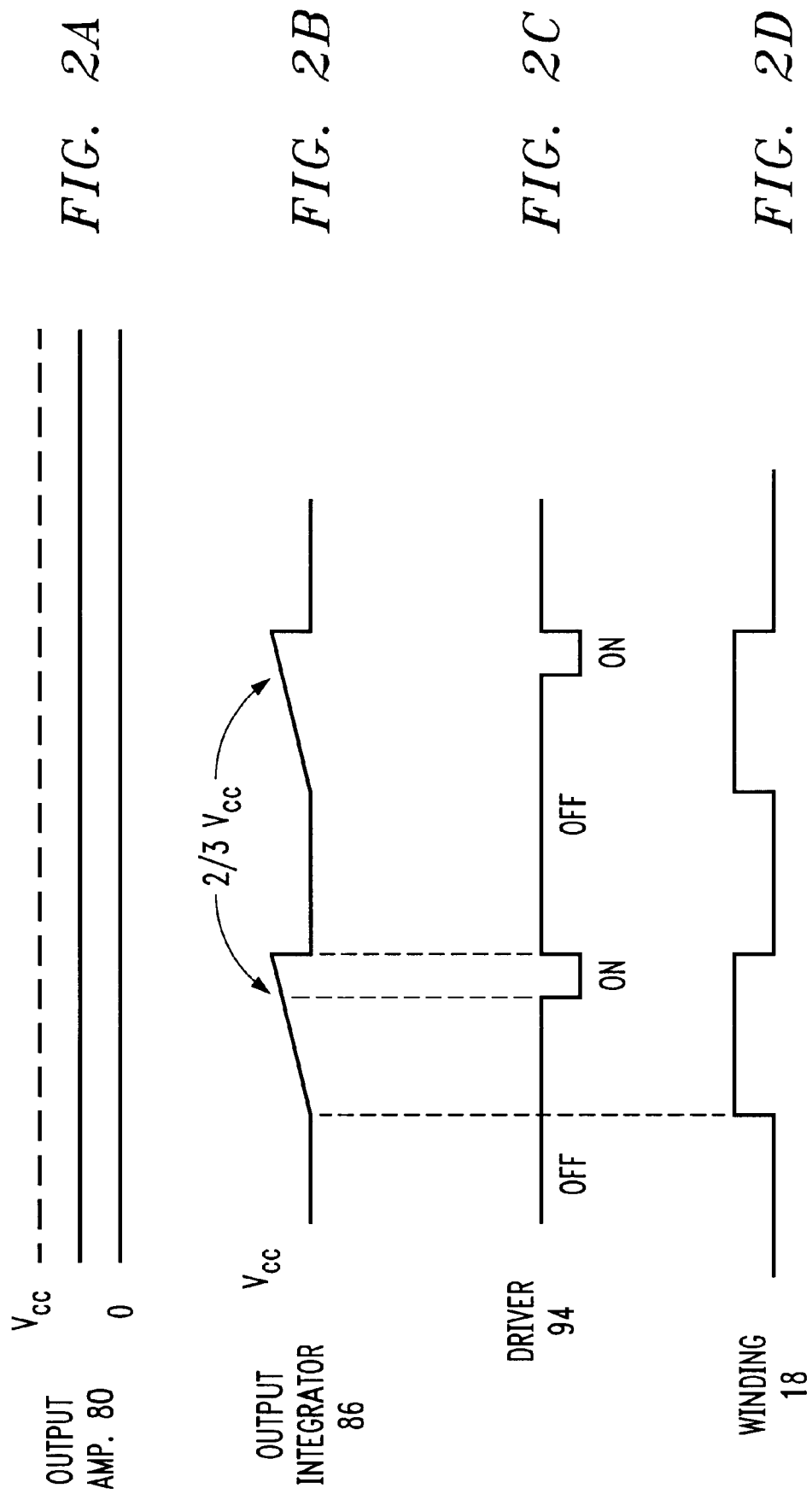
FIGS. 2a, 2b, 2c and 2d illustrate timing diagrams for the present DC—DC converter.

Referring simultaneously to FIGS. 1 and 2, the present self-synchronized pulse width modulator circuit 70 operation will now be described. The PWM circuit 70 is powered by a house keeping supply voltage, generally referred to as Vcc, which applies power to amplifier 80 and driver 94. The output of error amplifier 80 is a DC voltage (FIG. 2a) and acts to regulate the duty cycle of converter 10. In the exemplary embodiment of FIGS. 1 and 2, the inverting driver 94 is a member of the TPS2812 family of MOSFET drivers, manufactured by the Texas Instruments Company of Dallas, Tex. The TPS2812 MOSFET drivers typically exhibit a hysteretic input turn-on and turn-off characteristic of ⅓ Vcc and ⅔ Vcc, respectively. A wide input hysterisis characteristic will act to improve the noise immunity of the PWM circuit, although other drivers having different input characteristics are within the scope of the present invention. Assuming the output of driver 94 goes low when the input is above ⅔ Vcc, and goes high when the input falls below ⅓ Vcc, an exemplary voltage waveform at the output of integrator circuit 86 is shown in FIG. 2b. The output of driver 94 is shown in FIG. 2c, and the voltage present on terminal 18a of secondary winding 18 is shown in FIG. 2d.

Switch 92 is a p-channel MOSFET and is on when the output of driver 94 is low. Capacitor 96, diode 98 and resistor 100 form an inverting charge pump circuit which acts to translate the voltage waveform at the output of driver 94 into a negative voltage waveform more appropriate for driving p-channel FET 92. As the output of amplifier 80 moves up and down, the ramp at the output of integrator circuit 86 increases or decreases slope, respectively. An increase in slope at the output of integrator circuit 86 increases the time that switch 92 is on, and a decrease in slope at the output of integrator 86 decreases the time switch 92 is on, thus performing self regulation. Diode 104 ensures that capacitor 90 is reset and properly synchronized to the natural power train waveforms of transformer 12. Diode 104 could also be replaced with a transistor switching device, provided proper drive were applied.

The specific position of switch 92 is a function of normal design choices, and would work equally well, for example, in series with terminal 18a, provided the proper drive were applied. The device technology of switch 92 is also a function of normal design choices, and may comprise virtually any technology provided proper drive were applied, including but not limited to n-channel MOSFETs, bipolar transistors, lateral MOSFETs, and GaAs FETs. Additionally, winding 16 and the corresponding output 38 are not necessary to practice the present invention. If, for example, the input circuit 22 were of a fixed duty cycle and providing no regulation function, the present invention would be advantageous in providing self synchronized secondary side post regulation to output 40.

Diodes 52, 48, 56 and 62 may be replaced with synchronous rectifier FETs, to enhance the conversion efficiency of converter 10. The present invention is compatible with a variety of synchronous rectifier drive techniques, including control driven and self driven techniques.

Figure 3:
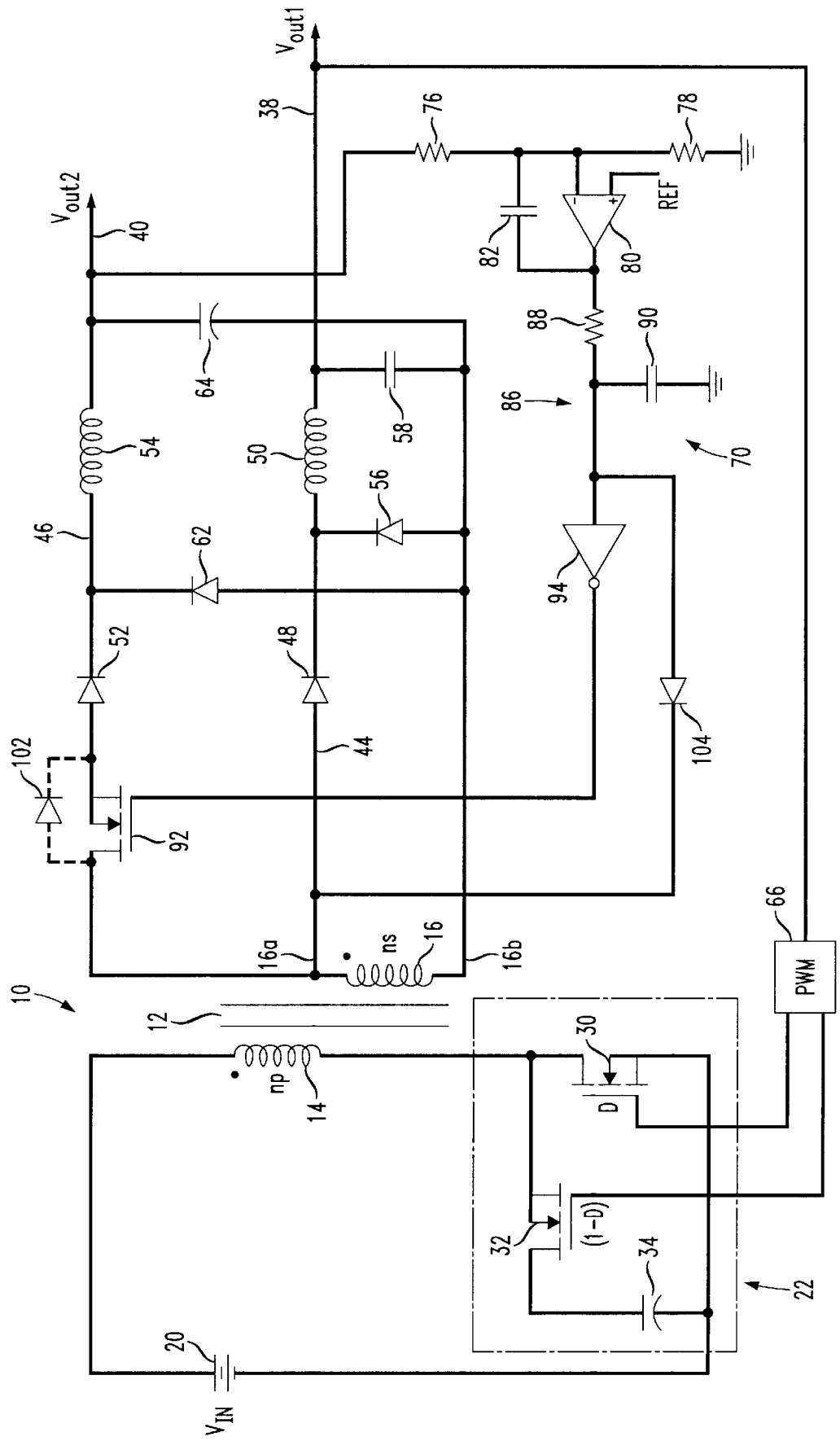
FIG. 3 is a schematic of an additional embodiment of the present DC—DC converter.

FIG. 3 illustrates an additional embodiment of the present converter 10 in which transformer 12 includes a single secondary winding 16 and an n-channel MOSFET 92.

It therefore can be seen that the present invention provides for closed loop regulation of a multiple output converter in which independent regulation occurs using minimal circuit components and in which a self-regulated PWM is utilized.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A DC—DC converter, comprising:

a power transformer having at least a primary winding and a secondary winding;

an input circuit coupled to said primary winding for coupling an input DC voltage to said primary winding;

an output channel coupled to said secondary winding and having a rectifier circuit and a filter circuit for providing DC power to a load, said rectifier circuit further comprising a control switching device;

a self synchronized PWM circuit for controlling a conduction interval of said control switching device thereby independently regulating the DC power at said output channel, said PWM circuit having an amplifier circuit coupled to said output channel and providing a substantially DC error voltage to an integrator circuit, said integrator circuit further coupled to a switch driver, said switch driver further coupled to said control switching device, and a reset circuit; and wherein said reset circuit is coupled between said secondary winding and said integrator circuit and is capable of resetting said integrator thereby synchronizing said PWM circuit to an operating frequency of said secondary winding.

2. The converter of claim 1 wherein said input circuit comprises:

a first switch connected in series with said primary winding and said input DC voltage;

a clamping circuit including a storage capacitor; and a second switch enabled to couple said storage capacitor to said primary winding when said first switch is non-conducting.

3. The converter of claim 1 wherein said input circuit is selected from the group consisting of:

a zero voltage switching half bridge; and a hard switching half bridge; and a push pull circuit; and a fall bridge; and a forward converter.

4. The converter of claim 1 further comprising:

a second output channel coupled to said secondary winding and having a rectifier circuit and a filter circuit for providing DC power to a load; and a pulse width modulator coupled between said second output channel and said input circuit to drive said input circuit, thereby regulating the DC power at said second output channel.

5. The converter of claim 1 and further comprising:

a second secondary winding coupled to said power transformer;

a second output channel coupled to said second secondary winding and having a rectifier circuit and a filter circuit for providing DC power to a load; and a pulse width modulator coupled between said second output channel and said input circuit to drive said input circuit, thereby regulating the DC power at said second output channel.

6. The converter of claim 1 wherein said rectifier circuit comprises a synchronous rectifier circuit.

7. The converter of claim 1 wherein said integrator circuit includes a resistor and capacitor.

8. The converter of claim 1 wherein said reset circuit comprises a diode.

9. The converter of claim 1 wherein said switch driver exhibits a hysteretic input characteristic.

10. The converter of claim 1 wherein said control switching device is a p-channel MOSFET.

11. The converter of claim 10 wherein an inverting charge pump circuit is coupled between a control terminal of said control switching device and said switch driver.

12. A DC—DC converter, comprising:

a power transformer having at least a primary winding and a secondary winding;

an input circuit coupled to said primary winding for coupling an input DC voltage to said primary winding;

a first output channel coupled to said secondary winding and having a rectifier circuit and a filter circuit for providing DC power to a load, said rectifier circuit further comprising a control switching device;

a second output channel coupled to said secondary winding and having a rectifier circuit and a filter circuit for providing DC power to a load;

a pulse width modulator coupled between said second output channel and said input circuit to drive said input circuit, thereby regulating the DC power at said second output channel;

a self synchronized PWM circuit for controlling a conduction interval of said control switching device thereby independently regulating the DC power at said output channel, said PWM circuit having an amplifier circuit coupled to said output channel and providing a substantially DC error voltage to an integrator circuit, said integrator circuit further coupled to a switch driver, said switch driver further coupled to said control switching device, and a reset circuit; and wherein said reset circuit is coupled between said secondary winding and said integrator circuit and is capable of resetting said integrator thereby synchronizing said PWM circuit to an operating frequency of said secondary winding.

13. The converter of claim 12 wherein said rectifier circuit comprises a synchronous rectifier circuit.

14. The converter of claim 13 wherein said integrator circuit includes a resistor and capacitor.

15. The converter of claim 14 wherein said reset circuit comprises a diode.

16. The converter of claim 15 wherein said switch driver exhibits a hysteretic input characteristic.

17. The converter of claim 16 wherein said control switching device is a p-channel MOSFET.

18. The converter of claim 17 wherein an inverting charge pump circuit is coupled between a control terminal of said control switching device and said switch driver.

19. A DC—DC converter, comprising:
- a power transformer having at least a primary winding and a secondary winding;
- an input circuit coupled to said primary winding for coupling an input DC voltage to said primary winding;
- an first output channel coupled to said secondary winding and having a rectifier circuit and a filter circuit for providing DC power to a load, said rectifier circuit further comprising a control switching device;
- a second secondary winding coupled to said power transformer;
- a second output channel coupled to said second secondary winding and having a rectifier circuit and a filter circuit for providing DC power to a load; and
- a pulse width modulator coupled between said second output channel and said input circuit to drive said input circuit, thereby regulating the DC power at said second output channel;
- a self synchronized PWM circuit for controlling a conduction interval of said control switching device thereby independently regulating the DC power at said output channel, said PWM circuit having an amplifier circuit coupled to said output channel and providing a substantially DC error voltage to an integrator circuit, said integrator circuit further coupled to a switch driver, said switch driver further coupled to said control switching device, and a reset circuit; and
- wherein said reset circuit is coupled between said secondary winding and said integrator circuit and is capable of resetting said integrator thereby synchronizing said PWM circuit to an operating frequency of said secondary winding.

20. The converter of claim 19 wherein said rectifier circuit comprises a synchronous rectifier circuit.

21. The converter of claim 20 wherein said integrator circuit includes a resistor and capacitor.

22. The converter of claim 21 wherein said reset circuit comprises a diode.

23. The converter of claim 22 wherein said switch driver exhibits a hysteretic input characteristic.

24. The converter of claim 23 wherein said control switching device is a p-channel MOSFET.

25. The converter of claim 24 wherein an inverting charge pump circuit is coupled between a control terminal of said control switching device and said switch driver.

* * * * *